Figure 1:
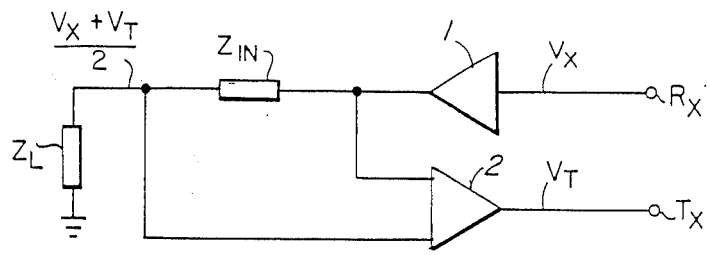

United States Patent [19]

Schingh

[11] Patent Number: 4,742,540
[45] Date of Patent: May 3, 1988

[54] CIRCUIT FOR SWITCHING BETWEEN BALANCED NETWORKS

[75] Inventor: Pierre J. Schingh, Gatineau, Canada

[73] Assignee: Mitel Corporation, Ontario, Canada

[21] Appl. No.: 931,410

[22] Filed: Nov. 14, 1986

[30] Foreign Application Priority Data

Apr. 9, 1986 [CA] Canada ................................. 506245

[51] Int. Cl.$^4$ ............................................. H04M 1/76
[52] U.S. Cl. .................................... 379/403; 379/398; 307/494; 333/32
[58] Field of Search ........................ 307/39, 490, 494; 333/213, 214, 215, 124, 125, 136, 32, 33; 379/340, 345, 346, 398, 399, 400, 401, 402, 403, 404, 405

[56] References Cited

U.S. PATENT DOCUMENTS

| 4,100,515 | 7/1978 | Gupta | 379/403 X |
| 4,275,270 | 6/1981 | de la Plaza | 379/405 X |
| 4,276,450 | 6/1981 | Chowaniec | 379/404 X |
| 4,361,732 | 11/1982 | Wood | 379/398 |
| 4,677,667 | 6/1987 | Burns | 379/398 |

FOREIGN PATENT DOCUMENTS

| 3203124 | 7/1983 | Fed. Rep. of Germany | 379/340 |
| 0037937 | 3/1982 | Japan | 379/402 |

Primary Examiner—Jin F. Ng
Assistant Examiner—R. Vaas
Attorney, Agent, or Firm—Laff, Whitesel, Conte & Saret

[57] ABSTRACT

A circuit for switching one of two impedance networks to a line carrying AC signals comprising a unity gain amplifier having differential inputs connected across the first one of the impedance networks, and one of the differential inputs and an output connected across the second one of the impedance networks, and a microprocessor control terminal connected to the other of the differential inputs for applying one of either a high impedance or AC ground thereto. The circuit is small, inexpensive, requires no electromechanical parts, and takes up very little circuit board area.

10 Claims, 1 Drawing Sheet

CIRCUIT FOR SWITCHING BETWEEN BALANCED NETWORKS

This invention relates in general to impedance switching circuits, and more particularly to a circuit for switching one of two impedance balancing networks to a telephone line.

Telephone hybrid circuits are well known for coupling audio signals between balanced bidirectional telephone lines or trunks and unbalanced receive and transmit lines in modern day PABXs. In North America, balanced telephone lines typically exhibit a nominal line impedance of 600 ohms. Thus, prior art North American hybrid circuits typically applied a received input signal to the balanced line, through a receive amplifier in series with a 600 ohm resistor, in order to match the nominal 600 ohm line impedance.

Regulatory authorities in the United Kingdom have recently established a standard wherein the nominal telephone line impedance can assume one of two complex impedances corresponding to short and long subscriber loops respectively. Thus, hybrid circuits utilized in the United Kingdom are required to match the nominal short or long loop complex impedance by selectively switching one of two complex impedance balancing networks to the line.

Prior art balancing network circuits typically utilized a microprocessor controlled electromagnetic relay for switching one of two impedance networks to the line.

Modern day electronic circuitry tends to substantially alleviate the requirement of utilizing such mechanical parts, since it has been found that electromagnetic devices incorporating mechanical moving parts are susceptible to mechanical failure and are of inherently low reliability. Also, electromagnetic devices such as relay contacts and coils typically take up considerable circuit board area and increase the weight and bulk of a circuit board.

According to the present invention, a solid state circuit is provided for switching one of two impedance balancing networks to a telephone line under microprocessor control. The circuit of the present invention is small, inexpensive and considerably more reliable than prior art electromagnetic switching circuits. Also, whereas electromagnetic relays typically consume considerable power in order to energize relay coils, etc., the circuit according to a preferred embodiment of the present invention comprises only a single differential amplifier and a plurality of resistors which draw very little current, and consequently consume very little power.

Figure 2:
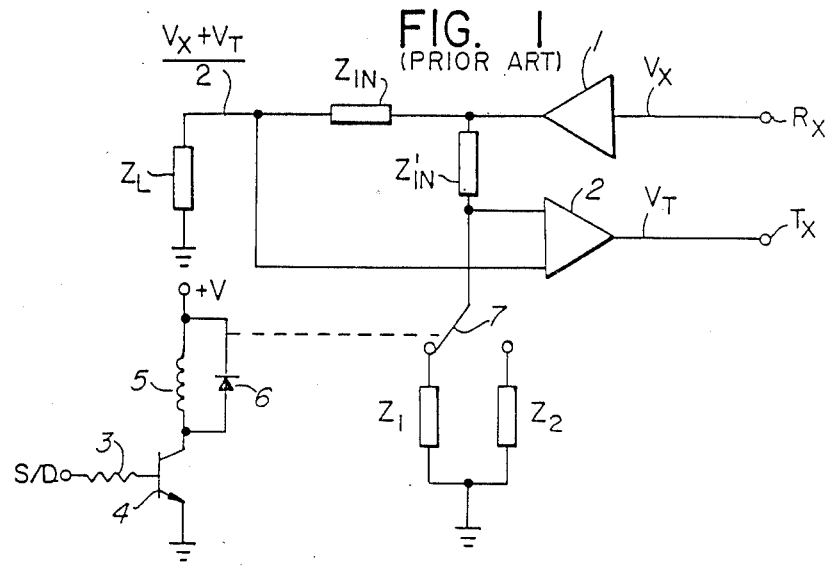
Figure 3:
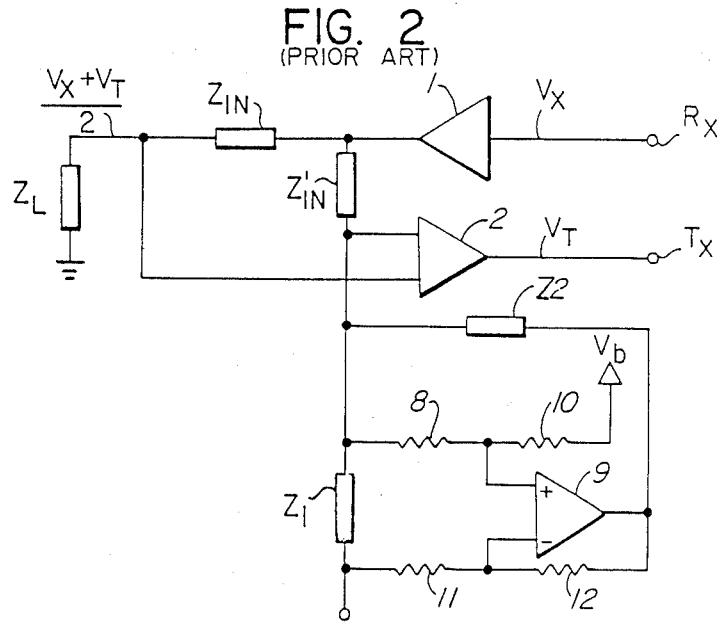

A better understanding of the present invention will be obtained with reference to the detailed description below in conjunction with the following drawings is which:

FIG. 1 is a simplified block schematic diagram of a hybrid circuit for use in North America, according to the prior art, FIG. 2 is a simplified block schematic diagram of a hybrid circuit for use in the United Kingdom, according to the prior art, and FIG. 3 is a simplified block schematic diagram of a hybrid circuit for use in the United Kingdom incorporating a circuit for connecting one of two impedance balancing networks to a telephone line, according to the present invention.

With reference to FIG. 1, a signal $V_x$ is applied to a terminal $R_x$, from a PBX or central office, and amplified in a receive amplifier 1. The amplified signal is then differentially applied to a balanced telephone line connected to a remote central office or PBX, through an input balancing impedance $Z_{IN}$. As discussed above, the impedance of telephone lines in North America has been standardized at approximately 600 ohms. According to FIG. 1, the 600 ohm line impedance is represented by an impedance element $Z_L$. The input impedance $Z_{IN}$ is typically chosen to be a 600 ohm resistance, for matching the impedance of the telephone line.

Signals received from the telephone line, denoted as $V_l$, are applied to a first input of a transmit amplifier 2, and transmitted therefrom to a transmit terminal $T_x$ of the local PBX or central office. A transmitted signal received from the telephone line is denoted as $V_l$.

Since the line impedance $Z_L$ is matched by the impedance $Z_{IN}$, a signal of the form $(V_x+V_l)\div 2$ appears on the telephone line.

The signal $V_x$ amplified in amplifier 1 is applied to a second input of amplifier 2 in order that the portion of the signal $V_x$ which appears on the telephone line and is applied to the first input of amplifier 2 is cancelled therein. The gain of amplifier 2 is chosen such that signals applied to the first input are amplified by a factor of 2 and signals applied to the second input are amplified by a factor of $-1$. Thus, the signal output from amplifier 2 is $V_x+V_l-V_x=V_l$.

However, as discussed above, the United Kingdom regulatory authorities have established a standard whereby the impedance $Z_L$ of the telephone line can assume one of two complex impedances, denoted as short and long impedances. Thus, whereas in North America balancing and cancellation are realized by appropriate selection of a line balancing impedance $Z_{IN}$ and appropriate adjustment of gain, in the United Kingdom one of two complex impedance balancing networks must be connected to the line for matching one of the short or long line impedances.

With reference to FIG. 2, a prior art hybrid circuit is shown in which a further input balancing impedance $Z'_{IN}$ (having equal impedance to $Z_{IN}$) is connected from the output of receive amplifier 1 to the second input of transmit amplifier 2, and a relay contact is connected to the second input of amplifier 2 and to one of two input impedance balancing networks, denoted as Z1 and Z2.

A sense/drive terminal S/D of an external controller, such as a microprocessor, is connected via a resistor 3 to the base terminal of a transistor 4 having an emitter terminal thereof connected to ground and a collector terminal connected to a relay coil 5. Relay coil 5 is connected to a source of potential $+V$, and a protective diode 6 is connected across the coil, in a well known manner.

In operation, relay contact 7 is normally connected to the short line balancing network Z1 for matching the short impedance $Z_L$ of the line in the event the line is of short loop length. In the event the line is of long loop length (i.e.) $Z_L$ is of high complex impedance), the external controller generates a logic high level signal for application to the S/D terminal which forward biases the base-emitter junction of transistor 4 such that current flows from the source of voltage $+V$ through coil 5 and the collector/emitter junction of transistor 4 to ground, thereby energizing coil 5 and causing relay contact 7 to switch to the long line balancing network Z2.

In this way, the prior art circuit switches between input impedance balancing networks Z1 and Z2 under microprocessor control, for matching the line impedance $Z_L$ and ensuring correct signal cancellation of the received signal $V_x$ in amplifier 2.

As discussed above, electromechanical relays incorporating moving parts suffer from well known disadvantages of low reliability, high current consumption and large size and bulkiness.

Thus, according to the present invention, a solid state circuit is utilized for switching between the line balancing networks Z1 and Z2, as illustrated in FIG. 3.

Balancing networks Z1 and Z2 are connected together and to the second input of amplifier 2. A resistor 8 is connected to the second input of amplifier 2 and to a non-inverting input of a unity gain amplifier 9. A second resistor 10 is connected to the non-inverting input of amplifier 9 and to a source of bias voltage $V_b$.

A further resistor 11 is connected to a node connecting balancing network Z1 and the S/D terminal, and to an inverting input of amplifier 9. A feedback resistor 12 is connected from the inverting input of amplifier 9 to an output thereof in a well known manner, and the output of amplifier 9 is connected to the long line impedance balancing network Z2.

Each of resistors 8, 10, 11 and 12 are preferably of identical resistance and of much greater resistance than the impedance of least network Z1.

In operation, in order to switch network Z1 to the line, the external controller generates a logic low or AC ground signal for application to the S/D terminal. The signal $V_x$ appearing on the second input of amplifier 2 are differentially applied to the non-inverting and inverting inputs of unity gain amplifier 9 so as to be amplified by a factor of 1 and transmitted from the output of amplifier 9 to impedance network Z2. Hence, the signal $V_x$ appears with equal amplitude and phase on both sides of network Z2. Thus, impedance Z2 appears as an infinite impedance or open circuit to the receive signal $V_x$, and the signal is thus applied only to the Z1 network. Accordingly, the Z1 impedance balancing network is thereby effectively switched to the line.

In this way, receive signals $V_x$ appearing on the output of amplifier 1 are applied equally to the two inputs of amplifier 2 and cancelled therein since Z1 is chosen to have an impedance equal to the short loop impedance of the line $Z_L$, and the input impedances $Z_{IN}$ and $Z'_{IN}$ are chosen to be equal.

In order to switch the long line balancing network Z2 to the line, the external controller applies an open circuit or high impedance to the S/D terminal. The receive signal $V_x$ appearing on the second input of amplifier 2 is applied substantially equally to the inverting and non-inverting inputs of amplifier 9 since the resistance of equal valued resistors 8 and 11 is much greater than the impedance of network Z1. Thus, the $V_x$ signal is cancelled in amplifier 9 such that the output thereof goes to AC ground level. Accordingly, the circuit comprising Z1, resistor 8, resistor 11 and the inputs of amplifier 9 form a high impedance or open circuit to the $V_x$ signal appearing on the second input of amplifier 2, and the $V_x$ signal is thus applied to the network Z2 which is effectively switched to the line.

In this manner, the Z1 and Z2 networks are alternately switched to the telephone line under control of the external controller, and depending on whether the line impedance $Z_L$ corresponds to a long or short loop. No mechanical or electromechanical parts are required, such that the disadvantages of prior art systems are overcome. Further, the circuit according to the present invention takes very little circuit board area, is reliable and consumes very little power.

A person understanding the present invention may conceive of other embodiments or variations therein. For instance, while the present circuit has been discussed in relation to telephone circuits and balancing networks, it will be understood by a person skilled in the art that the present circuit may be utilized for switching complex impedances or non-complex resistances to any line carrying an AC signal. Thus, the circuit according to the present invention may advantageously be used in audio circuits, etc.

Also, whereas the description herein above refers to switching impedance networks Z1 and Z2, simple resistors, capacitors, etc., maybe switched according to the principles of the invention.

All these and other embodiments are considered to be within the sphere and scope of the present invention as defined in the claims appended hereto.

I claim:

1. A circuit for switching one of two impedance networks to a line carrying AC signals, comprised of:
   (a) unity gain amplifier means having first and second inputs, said first input being connected to the line, said first and second inputs being connected across a first one of said networks, and said first input and an output of said amplifier means being connected across the second of said two networks, and
   (b) means for connecting and disconnecting said second input from a source of AC ground,
   whereby in the event said second input is connected to the source of AC ground, AC signals carried by the line are applied differentially to said first and second inputs, amplified in said unity gain amplifier means so as to be applied substantially equally across said second network such that said first network is switched to the line, and in the event said second input is disconnected from the source of ground, AC signals carried by the line are applied substantially equally to said first and second inputs, cancelled in said unity gain amplifier means such that the voltage on said output of the amplifier means goes to AC ground level and said second network is switched to the line.

2. A circuit as defined in claim 1, wherein said unity gain amplifier means is a differential amplifier, said first input is a non-inverting input and said second input is an inverting input.

3. A circuit as defined in claim 2, further including four equal valued resistors having resistance substantially greater than at least the impedance of said first network, a first one of said resistors being connected between said line and said non-inverting input, a second one of said resistors being connected between said non-inverting input and a source of bias voltage, a third one of said resistors being connected between said inverting input and said means for connecting and disconnecting, and a fourth one of said resistors being connected between said inverting input and said output.

4. A circuit as defined in claim 3, wherein each of said resistors has a resistance of 800k ohm.

5. A circuit as defined in claim 1, wherein said networks are impedance balancing networks for use in a telephone hybrid circuit.

6. A circuit as defined in claim 1, wherein said means for connecting and disconnecting is comprised of circuitry for applying one of either a high impedance or AC ground to said second input under microprocessor control.

7. A circuit as defined in claim 2, wherein said networks are impedance balancing networks for use in a telephone hybrid circuit.

8. A circuit as defined in claim 3, wherein said networks are impedance balancing networks for use in a telephone hybrid circuit.

9. A circuit as defined in claim 2, wherein said means for connecting and disconnecting is comprised of circuitry for applying one of either a high impedance or AC ground to said second input under microprocessor control.

10. A circuit as defined in claim 3, wherein said means for connecting and disconnecting is comprised of circuitry for applying one of either a high impedance or AC ground to said second input under microprocessor control.

* * * * *